United States Patent Office 3,035,973
Patented May 22, 1962

3,035,973
GELATIN CAPSULE CONTAINING CALCIUM
DIOCTYL SULFOSUCCINATE
Lyell J. Klotz, Cincinnati, Ohio, assignor to Lloyd Brothers, Inc., Cincinnati, Ohio, a corporation of Ohio
No Drawing. Filed Aug. 1, 1958, Ser. No. 752,410
4 Claims. (Cl. 167—56)

The present invention relates to calcium dioctyl sulfosuccinate, i.e. the calcium salt of the bis(2-ethylhexyl) ester of a sulfosuccinic acid, and more specifically to a dosage unit containing a non-aqueous, i.e. oil, solution of calcium dioctyl sulfosuccinate in a soft gelatin capsule. This combination is unique due to its freedom from what is known in the art as "leakers," i.e. capsules that leak at the seams on standing.

The use of dioctyl sodium sulfosuccinate (also known as Aerosol OT) in milk, fruit juices and the like for treating constipation has been proposed heretofore. Wilson and Dickinson J.A.M.A., vol. 158, pages 261–263 (1955). See also Vaughan application Serial No. 537,873, filed September 30, 1955, now abandoned. The use of dioctyl sodium sulfosuccinate for the treatment of constipation has been demonstrated as safe, reliable and effective and it is available today for this purpose in various forms.

One of the preferred ways of administering dioctyl sodium sulfosuccinate is in solution in a suitable non-aqueous solvent in soft gelatin capsule form. The non-aqueous solvent (such as liquid polyethylene glycol, mineral oil, corn oil, etc.) must be inert, i.e. not exert any appreciable solvent action on the gelatin comprising the shell. Difficulties, however, have been encountered in preparing sufficiently concentrated solutions in such solvents so that capsules of desirable (small) size and content can be used (see Klotz application Serial No. 581,855, filed May 1, 1956, now Patent 2,885,322), but one of the primary difficulties has been in the presence of "leakers." Indeed, unless used promptly, hundreds of thousands of dollars have been lost on "returns" due to the leaking of the solution of dioctyl sodium sulfosuccinate from soft gelatin capsules, where even one leaker messes up the whole container and makes it unsaleable. Attempts to solve this problem by use of different solvents, modified gelatin formulations, etc. have proven unsuccessful. Unless used shortly after encapsulating, leakers have been found to turn up on standing when solutions of dioctyl sodium sulfosuccinate are placed in soft gelatin capsules.

In my investigations in this field it was noted that it is the practice of the trade to plasticize the gelatin used in making "soft gelatin" capsules with up to abuot 20 percent glycerine or equivalent polyhydroxy aliphatic plasticizers such as mixtures of glycerine and sorbitol containing up to 50 percent sorbitol, 1,2,6-hexanetriol (trihydroxy-hexane) and the like. In fact, unless a plasticizer is used, the gelatin becomes hard and brittle and is unsuitable for use for these reasons in this field.

In my investigations it was also noted that dioctyl sodium sulfosuccinate was extremely soluble in glycerine and like plasticizers and that this might explain, at least in part, the cause of "leakers." For example, it appeared possible that the dioctyl sodium sulfosuccinate in solution in the core might gradually pass into the glycerine in the gelatin and cause loss of adhesion of the heat and pressure sealed seams of the capsule shell. Indeed, this appeared like a good possibility as it was further found that a substantially non-leaking capsule could be prepared from gelatin plasticized with sorbitol in which dioctyl sodium sulfosuccinate was not appreciably soluble. However, this possible solution to the "leaker" problem failed as it was found that the substitution of sorbitol for glycerine created other problems. Specifically, it was found that so much sorbitol was required to prepare a non-leaking capsule that the capsule deveolped a "bloom" on its surface, i.e. became white and opaque due to crystallization of the excessive amount of required sorbitol, and in this condition was unsaleable. Replacement of the sorbitol with about 50% or more of glycerine reduced the "blooming" problem but resulted in increased "leakers" and posed still another problem, i.e. the formation of what for a better term I have called "flatters." In the "flatters," the capsule loses its form (i.e. becomes misshapen), flattens and collapses and in this form is also unsaleable. Attempts to find a suitable solvent for dioctyl sodium sulfosuccinate which would prevent its passage into the plasticizer of the shell and attempts to find a substitute plasticizer which would neither take up the dioctyl sodium sulfosuccinate nor "bloom" nor result in the formation of "flatters" were unsuccessful.

Accordingly, and to check further into the above theoretical possibilities, calcium dioctyl sulfosuccinate was prepared as noted below. It was found to be insoluble in glycerine and like polyhydroxy plastlicizers but soluble in oils including mineral and vegetable oils such as corn oil, peanut oil, cottonseed oil, etc., as well as equivalent non-aqueous inert oil-type solvents such as liquid polyethylene glycols 200–400. Calcium dioctyl sulfosuccinate was then dissolved in mineral oil and corn oil and encapsulated in glycerine plasticized soft gelatin capsules to provide 240 mg. of the calcium salt per capsule. Control capsules using the same oils and glycerine plasticized gelatin with the same amount of dioctyl sodium sulfosuccinate (240 mg. capsules) were also prepared. All capsules were then subjected to an accelerated "leaker test" at 40° C. and 30% relative humidity. The results are shown in the following table.

TABLE

| Oil | Salt of Dioctyl Sulfosuccinate | Hours | Percent Leakers |
|---|---|---|---|
| Mineral | Sodium | 24–48 | 100 |
| Corn | do | 24–48 | 100 |
| Mineral | Calcium | 384 | 3 |
| Corn | do | 384 | 1 |

Extended tests using non-aqueous oil solutions of calcium dioctyl sulfosuccinate in glycerine or like plasticized soft gelatin capsules under conditions encountered in storage in this field has shown them to be substantially free from leakers. For overall solubility and freedom from leakers corn oil is generally preferred.

The calcium salt can be prepared by the following illustrative processes.

*Example I*

88 grams of dioctyl sodium sulfosuccinate is first dissolved in 100 cc. of isopropanol and 25 grams of calcium chloride is dissolved in 50 cc. of methanol. The solutions are then mixed and stirred for about 3 hours and then cooled with ice. The sodium chloride which precipitates in the cool mixture is removed by filtration and most of the alcohol is evaporated from the resulting filtrate with heat. The liquid remaining is poured into 88 cc. of water, and the resulting precipitate washed with water until free of chloride ion. The washed calcium salt is then dried. The magnesium salt of dioctyl sulfosuccinate can be prepared in a similar manner by the use of magnesium chloride in place of calcium chloride.

The calcium salt can also be prepared by dissolving the sodium salt in isopropanol, cooling, adding sulfuric acid, allowing the mixture to stand in an ice bath, filtering off the resulting sodium sulfate precipitate, and reacting the resulting dioctyl ester of sulfosuccinic acid with excess calcium carbonate. After removal of excess carbonate by filtration the calcium salt can be recovered from the filtrate by evaporating off the alcohol and drying. The calcium salt can also be prepared by the neutralization of the free acid (dioctyl ester of sulfosuccinic acid) with calcium hydroxide. The magnesium salt can be prepared in a similar manner by use of magnesium carbonate or magnesium hydroxide.

The calcium in the calcium salt is combined with two molecules of the bis(2-ethylhexyl) ester of sulfosuccinic acid and has the generic formula $C_{40}H_{74}CaO_{14}S_2$. The calcium salt has properties generally similar to the sodium salt although tests indicate the calcium salt to have even greater surface active wetting properties (10–40% greater depending on concentration) and to be a more efficient fecal softener. It is soluble in inert non-aqueous solvents such as mineral oil and vegetable oils such as corn oil, liquid polyethylene glycol and the like and can be used in place of the sodium salt as a fecal softener in soft gelatin capsules in solutions of this type with little or no danger of "leakers." Due to its great solubility the use of additives such as glyceryl oleates (see Klotz application, supra) to increase the solubility of the calcium sulfosuccinate are not required to obtain the concentrations necessary for use with small easy-to-take capsules. However, since the concentration necessary to produce 240 mg. calcium dioctyl sulfosuccinate in the convenient number 8 capsule is very near the saturation point, the addition of a small amount, e.g. 1–10 percent by volume, of glyceryl monooleate may be desirable and is in fact preferred to consistently insure a solution which will not "gel" at lowered temperatures. The following examples are illustrative.

*Example II*

Calcium dioctyl sulfosuccinate _____ gm__ 6,000
Corn oil, quantity sufficient to make 25,000 ml.

The calcium salt is dissolved in the oil with warming and the resulting solution then encapsulated in glycerine plasticized soft gelatin capsules in accordance with standard practices in the art to provide 100,000 #4 minims capsules containing 60 mg. of the calcium salt. In a similar manner capsules can be readily made containing 40–240 mg. of calcium dioctyl sulfosuccinate.

*Example III*

Calcium dioctyl sulfosuccinate _____ kg__ 12.6
Glyceryl monooleate _____ l__ 1.8025
Corn oil, quantity sufficient to make 24.025 l.

The calcium salt is dissolved in the glyceryl monooleate and about 7 liters of oil with heating and then cooled and upon cooling sufficient corn oil is added to bring the solution to the required volume. The resulting solution is then encapsulated in standard glycerine plasticized soft gelatin capsules to provide 52,500 capsules containing about 240 mg. of the calcium salt per capsule. The solution in the capsules so prepared does not "gel" even at temperatures below room temperature and the capsules are substantially free from leakers.

The calcium dioctyl sulfosuccinate of the present invention can be combined with other medicaments including 1,8-dihydroxyanthraquinone (danthron) or like cathartic in a similar manner to that described in the copending Vaughan application Serial No. 623,282, filed November 20, 1956, now Patent No. 2,847,346. The following example is illustrative.

*Example IV*

|   | Gm. |
|---|---|
| Calcium dioctyl sulfosuccinate | 300 |
| 1,8-dihydroxyanthraquinone | 250 |

Polyethylene glycol 200 q.s. ad 2500 cc.

The calcium dioctyl sulfosuccinate is first dissolved in about 1500 cc. of polyethylene glycol with warming. To facilitate solution and particularly to maintain the succinate in solution a small amount (e.g. about 1–5 percent) glyceryl mono- or di-oleates can be added as described in the Klotz application, supra. The danthron in finely divided form is then thoroughly mixed with the succinate solution. To aid in stabilizing the suspension small amounts of viscosifying (suspending) agents such as hydrogenated vegetable oil, white beeswax and the like can be added to the composition in accordance with standard practices in this art if desired. The composition is then brought up to 2500 cc. with polyethylene glycol 200 and encapsulated into 5000 glycerine or like plasticized soft gelatin (about 0.5 cc. each) capsules. Each capsule contains about 60 mg. of calcium dioctyl sulfosuccinate and 50 mg. of danthron. Formulations of this type are also free from "leakers."

My investigations show that in place of the calcium salt the magnesium salt and all toher equivalent pharmaceutically acceptable salts of the dioctyl ester of sulfosuccinic acid (i.e. non-toxic metallic salts which do not liberate toxic ions on ionization) can be used in the present invention providing they, like the calcium salt, (a) are soluble in inert non-aqueous oil solvents (e.g. mineral oil, fatty oils such as the vegetable and animal oils, liquid polyethylene glycol, etc.) useful in making solutions for soft gelatin capsules and (b) are substantially insoluble in the plasticizer (e.g. glycerine, 1,2,6-hexane triol, mixtures such as glycerine containing up to 50 percent sorbitol, etc.) and like substances used in the manufacture of soft gelatin in the capsule art. Alkaline earth metals such as the calcium and magnesium salts of dioctyl sulfosuccinate (as distinguished from the alkali metal salts) are illustrative salts having these solubility characteristics which are required to eliminate "leakers" as well as "flatters" in the soft gelatin capsule art. The use of these or equivalent non-toxic salts in place of dioctyl sodium sulfosuccinate is also highly desirable where the intake of sodium ions is medically contra-indicated.

This application is a continuation-in-part of application Serial No. 737,226, filed May 23, 1958, now abandoned.

I claim:

1. A composition in dosage unit form comprising a glycerine plasticized gelatin-soft gelatin capsule containing about 40–240 mg. of calcium dioctyl sulfosuccinate dissolved in a non-aqueous inert oil.

2. A composition in accordance with claim 1 where the oil is corn oil.

3. A composition in accordance with claim 1 where the solution contains about 1–10% by volume of glyceryl monooleate.

4. A composition in accordance with claim 1 where the composition contains 1,8-dihydroxyanthraquinone.

References Cited in the file of this patent

UNITED STATES PATENTS

| 2,028,091 | Jaeger | June 14, 1936 |
| 2,585,903 | Meyer | Feb. 14, 1952 |
| 2,830,010 | Valentine | Apr. 8, 1958 |
| 2,847,346 | Vaughan | Apr. 12, 1958 |
| 2,851,394 | Vaughan | Sept. 9, 1958 |
| 2,870,060 | Bryan | Jan. 20, 1959 |
| 2,871,157 | Cardaciotto | Jan. 27, 1959 |
| 2,871,158 | Cardaciotto | Jan. 27, 1959 |

OTHER REFERENCES

J.A.M.A., Wilson article, May 28, 1955, pp. 261–263.